Patented Jan. 27, 1931

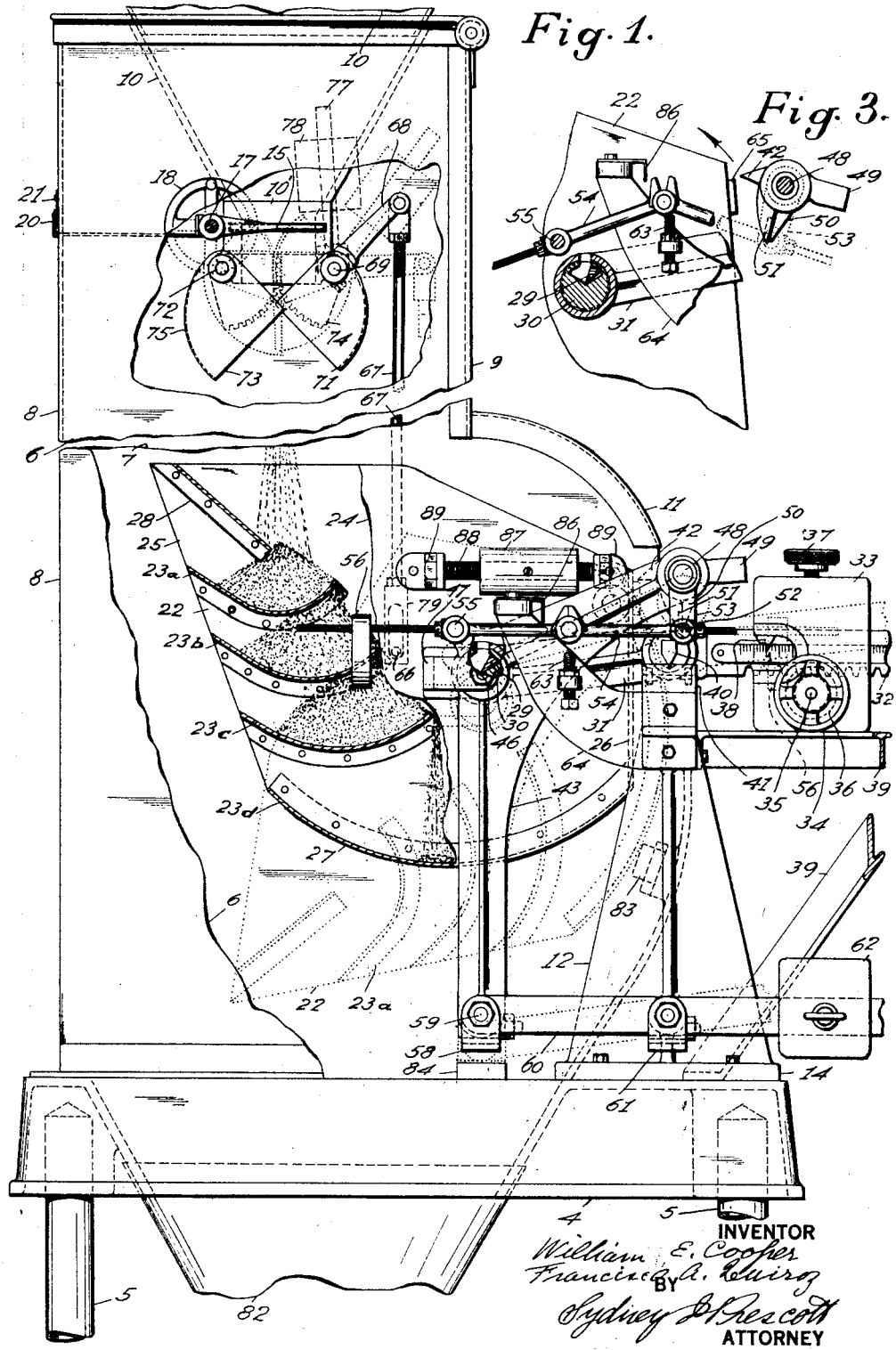

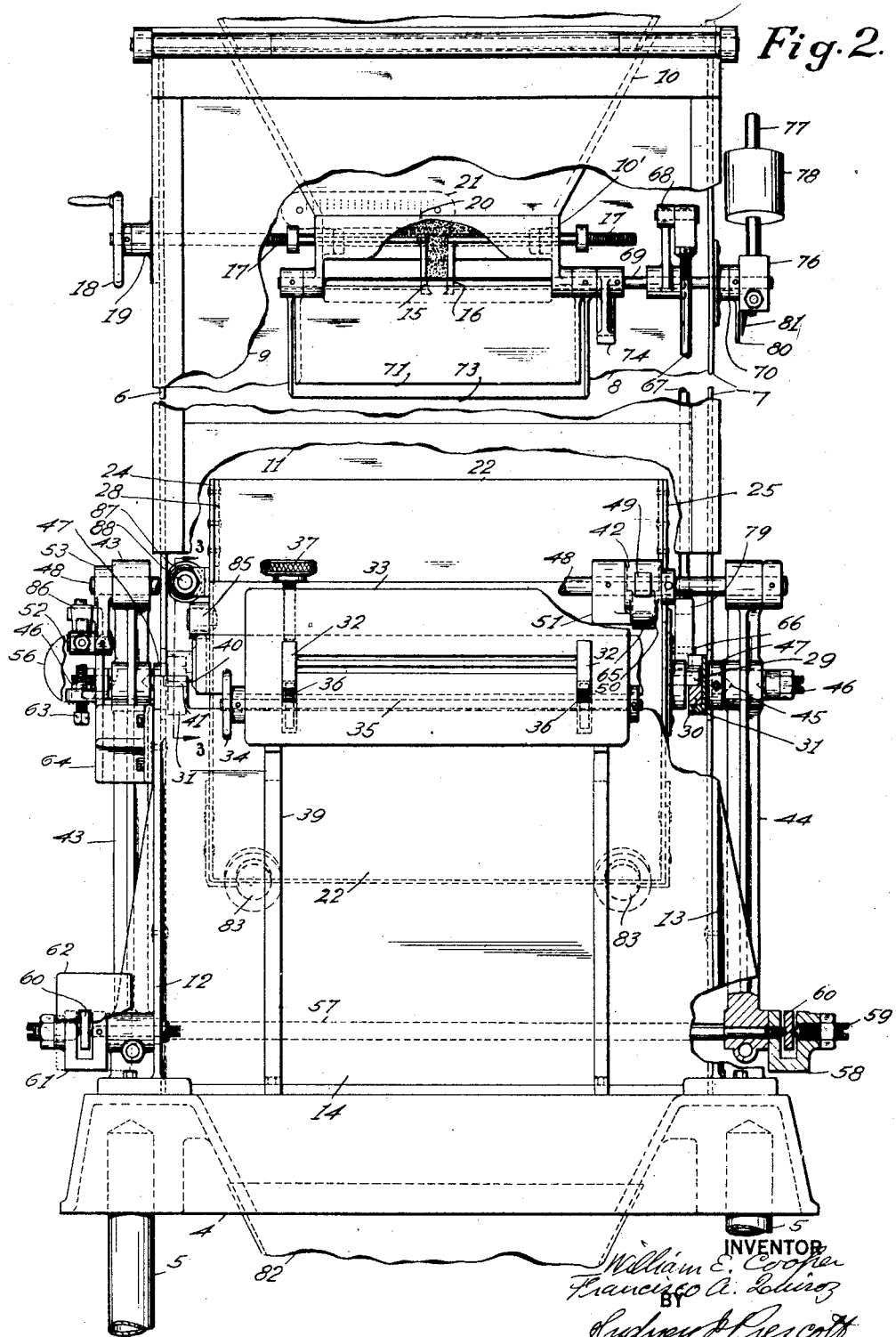

1,790,366

UNITED STATES PATENT OFFICE

WILLIAM E. COOPER, OF MENDHAM, NEW JERSEY, AND FRANCISCO A. QUIROZ, OF BROOKLYN, NEW YORK, ASSIGNORS TO AMERICAN MACHINE & FOUNDRY COMPANY, A CORPORATION OF NEW JERSEY

AUTOMATIC WEIGHING MACHINE

Application filed May 11, 1928. Serial No. 276,833.

This invention relates to automatic weighing machines of a type in which free flowing granulated powdered materials are received in a scale pocket from a magazine or hopper, and are automatically discharged from the bucket when a given weight of material has been received therein. A principal object of this invention is to provide such a machine in which any quantity of the material within its capacity will be weighed with approximately the same accuracy. Another object is to provide quick acting means for discharging the bucket, which will act equally well with small amounts in the bucket as with larger quantities of material. Another object is to provide quick and effective means for shutting the hopper gates in response to the balancing movement of the scale beam of the machine. With these and other objects not specifically mentioned in view, the invention consists of certain constructions and combinations which will be hereinafter fully described and then specifically set forth in the claims hereunto appended.

Generally speaking, the machine consists of a balance beam having pivoted on it a weighing bucket with a series of pockets, so designed in shape and position that the bucket fills from the top downwards instead of from the bottom upwards when material falls into it from the hopper. The uppermost pocket, which holds the smallest quantity of material and has the greatest lever arm with respect to the pivot, is placed directly below the hopper mouth where it fills first and tips the bucket when the scale beam is set for a weight within its capacity. When the weighing machine is set for a larger quantity, the material after filling the first pocket, will overflow, thereby gradually filling the pockets underneath until the quantity in the bucket over-balances the counter-weight on the balance beam. To attain the above results the pockets are arranged in echelon, i. e., parallel to each other but stepped out of alignment, so that an end of each projects beyond the same end of the one above.

The bucket, while being charged, is held stationary by a tripping device which is actuated by the swinging of the balance beam at the moment when the weight of the material for which the counterweight on the balance beam is set, has been fed, whereupon the bucket will tip and discharge the material. At the moment of tipping, the turning bucket through suitable connections automatically closes the hopper mouth, so that no more material is fed into the bucket until the latter, after delivering its weighed charge, has again returned into its horizontal or filling position. The hopper gate operating mechanism is provided with a weight actuated closing device which shuts the gates quickly after the closing action has been started by the swinging of the bucket.

In the accompanying drawings:

Fig. 1 is a side elevation of the weighing machine, with portions broken away;

Fig. 2 is a front elevation of the same, portions being broken away; and

Fig. 3 is a detail side elevation on line 3—3 of Fig. 2, showing the parts actuating the release of the bucket.

In carrying the invention into effect, there is provided in a weighing machine, a balance mechanism, a tilting scale bucket carried by said mechanism, which is provided with a series of pockets in echelon, and a supply hopper discharging material to be weighed into the uppermost pocket from which surplus material may overflow into one or more of the other pockets. In the best constructions contemplated, the balance mechanism has a toggle tripping device for releasing said bucket to discharge its contents. In the best constructions also, the hopper has weight actuated gates which are controlled by the movement of the bucket. The means above referred to may be widely varied in construction within the scope of the claims, for the particular machine selected to illustrate the invention is but one of many possible embodiments of the same. The invention therefore is not to be restricted to the precise details of the structure shown and described.

The base frame 4, which is supported by legs 5, carries a scale housing which consists of a front wall 6, a rear wall 7, a stationary side wall 8, and a movable side wall 9, hinged to the hopper 10 and carrying an arcuate cover 11. The front wall 6 and the rear wall 7 are fastened to the ends 12 and 13, respectively, of a pedestal bracket 14 resting on base 4. This scale housing supports the hopper 10 from its upper end.

The flow of material from the supply hopper 10 is regulated for different unit quantities to be weighed, by two angular aperture plates 15 and 16, which are slidably supported in slots of the frame 10' depending from the mouth of the hopper 10 and connected by a rod 17, having right and left handed threads. This rod has secured to it a handwheel 18 and is supported at one end by the bearing 19 attached to the front wall 6 of the scale housing. To the plate 15 is attached the rectangularly bent pointer 20 projecting through a slot of side wall 8 and indicating on the scale 21 the proper flow openings for different weights of material, in order that the same proportionate amount of material will be in the air at the tipping of the bucket for each amount weighed.

From the aperture thus set, the material falls into a scale bucket 22, and in order that small quantities may be weighed with the same accuracy as large ones, the bucket is arranged to start filling from the top and at a point therein which is most distant in a horizontal direction from the pivots of the bucket and the balance. The reason for this is that in this manner, if a small quantity of material is fed into the bucket, the center of gravity of this small quantity will be relatively distant in a horizontal direction from the pivot of the balance, and thus the balance will be more sensitive thereto and at the same time this small quantity being more distant from the pivot of the bucket, the bucket will be more sensitive to the weight thereof for dumping purposes. Thus the small quantity by this arrangement will have a longer lever arm with respect to the balance pivot than a large quantity. For this purpose the bucket is provided with a series of pockets, 23a, 23b, 23c and 23d, arranged in echelon one below the other, each lower one being larger than the one above and in a position nearer the balance pivot where it will receive the overflow from the pocket above. As shown in Fig. 1, the bottom of each pocket is curved and arranged to receive the material at one end and discharge it at the other.

The scale bucket 22 consists of a front wall 24, a rear wall 25, a side wall 26 and a bottom 27, the pockets and a guide chute 28 being attached across the walls 24 and 25. The bucket 22 has knife edges 29 resting in bushings 30 inserted into the ends of fork arms 31 of double balance beam 32.

The material streaming out of the hopper 10 is directed by the chute 28 into the uppermost pocket 23a. When this is filled to its capacity, the overflowing material is caught by the next lower pocket, and so on until the material in the bucket is in balance with the counterweight 33 on the balance beam 32. The counterweight 33 is adjusted by a handwheel 34 on a shaft 35, which has a spur gear 36 in engagement with racks cut in the under sides of the balance beam 32. A set screw 37 holds the counterweight 33 in place and a pointer 38 attached to the counterweight shows on the scale of balance beam 32, the proper setting of the counterweight to cause the beams to balance at the desired weight of material. The downward movement of the counterweight 33 is prevented by support bracket 39 attached to base 4 and to pedestal bracket 14, upon which the counterweight rests while the bucket is being charged. The balance beam 32 has knife edges 40 resting on hardened plates 41 supported by the scale pedestals 12 and 13.

Before the swinging of the balance arm 32, the bucket is prevented from tipping by a lug 42 engaging a shoulder of a block 65 fixed on the bucket, until the lug is withdrawn upon balancing movement of the beam, as will be presently described. In the ends of the fork arms 31 of the balance beam 32, there are pivoted the angular arms 43 and 44, which are pivotally supported between the pointed studs 45 and the pointed screws 43, the former being parts of the bushings projecting through arms 31, the latter being held by the U shaped pieces 47 affixed to the studs 45. The upper ends of arms 43 and 44 carry a rotatably mounted shaft 48 on which is loosely mounted a block 49 serving to mount lug 42 on the shaft 48 and also acting as a counterweight for the lug. This block 49 has a finger 50 projecting from a portion thereof near the shaft and bearing against the finger 51 which is fixedly mounted on shaft 48. By this means the lug 42 is held in approximately horizontal position, so that it can be easily displaced by downward movement of the block 65, but will prevent upward movement thereof.

On a stud 52 in a crank arm 53, fixedly mounted on the shaft 48, is pivoted one arm of toggle 54, whose other arm is pivoted on the stud 55 of the arm 43. Eccentrically mounted and adjustable threaded discs 56 on the outer ends of arms 54 serve to balance the toggle lever to regulate the pressure required to break the joint thereof. The lower ends of the arms 43 and 44 are connected by rod 57, which on both ends terminates in a pivot point. U-shaped blocks 58 are attached by one shank to the rod 57 near its ends, and have pointed pivot screws 59 in their other shanks. Between the pointed ends of rod 57 and of the screws 59 are pivoted the bars 60, the other ends of which are pivoted in the U-blocks 61 attached to the pedestal ends 12 and 13, on the front and back of the weighing machine. One of the bars 60 is extended beyond its stationary pedestal pivot and carries the counterweight 62, which holds the arms 43 and 44 in balance.

As soon as the weight of the material in the bucket 22 balances the counterweight 33 on the balance beam, the fork arms 31 of the balance beam carrying the bucket swing downwards, thereby causing the joint of the toggle lever 54 to hit against the adjustable stop screw 63 carried by bracket 64 attached to pedestal 12, breaking the joint, as shown in Fig. 3. This action moves crank arm 53 on shaft 48 and thereby turns finger 51, which has the nose 50 bearing against it, thus allowing lug 42 to follow the turning movement by virtue of weight block 49, thereby disengaging the stop block 65 on bucket 22 and allowing the bucket to tip due to the weight of the charge in its pockets. Thus on balancing movement of the balance beam 32, the effect of the stop 63 and the disengagement of the stop block by the lug 42 is to trip the toggle and release the bucket to discharge its contents.

As the bucket starts to tip, a pin 66 attached to the bucket wall 25 actuates a rod 67 connected with a lever 68 on a shaft 69 supported in the frame 10' of hopper 10 and in a bearing 70 attached to housing wall 7. Shaft 69 carries the hopper gate 71, while the shaft 72 also supported in the frame 10', carries the hopper gate 73. The shafts 69 and 72 are connected by gear segments 74 and 75 mounted on them. The actuation of rod 67 by pin 66 thus turns the shafts 69 and 72, thereby starting to close the gates 71 and 73 and at the same time turning the block 76 mounted on the outside end of shaft 69. Block 76 carries the upwardly pointing and slightly inclined rod 77, to which is attached the counterweight 78. Turning of the lever 68 by the rod 67 carries the weight 78 on the rod 77 beyond its dead center, so that the weight 78 descends by its own gravity, thus quickly actuating the gates 71 and 73. To permit this independent rapid motion of the gates, the rod 67 is attached to the pin 66 of the bucket by means of the slotted joint 79. The angular position of weight 78 is adjustable for different timing of the descent of weight 78, according to the amount of material weighed, by turning of block 76, which is adjustably clamped on the shaft 69. A small scale 80 mounted on shaft 69 indicates the setting of weight 78 with relation to the dead center by means of a pointer 81 mounted on the underside of block 76, so that the weight may readily be set at the position found most satisfactory for various operating conditions.

The tipped bucket discharges its material into the chute 82 fastened to the under side of base 4. A pair of rubber bumpers 83 limit the motion of the bucket and absorb the shock of its impact. A rubber block 84 mounted on the base 4 stops the downward movement of the arms 43 and 44, while a rubber roller 85 fastened to the bucket side wall 24 bears against arms 31, when the bucket after its material is discharged, swings back into its normal position. The arms 43 and 44, on account of the counterweight 62, then move upwards, the bent toggle joint hitting against the angular stop 86 attached to the top of bracket 64. The toggle joint is thereby straightened and closed, causing the crank arm 53 to turn the shaft 48 back into its normal position, placing the finger 42 again in engagement with stop block 65, thereby holding the bucket in position for the next weighing. The return of the bucket into its loading position also opens the hopper gates 71 and 73 through the action of rod 67.

The adjustable weight 87 mounted on the threaded rod 88 held by the angle pieces 89 attached to the side wall 24 of the bucket, serves to accurately balance the scale bucket.

What is claimed is:

1. In a weighing machine, the combination with balance mechanism, of a tilting scale bucket carried by said mechanism and provided with a series of pockets in echelon, and a supply hopper discharging material to be weighed into the uppermost pocket from which surplus material may overflow into one or more of the other pockets.

2. In a weighing machine, the combination with balance mechanism, of a tilting scale bucket carried by said mechanism and provided with a series of pockets in echelon, and a supply hopper discharging material to be weighed into the uppermost pocket from which surplus material may overflow into one or more of the other pockets, said pockets having curved bottoms receiving material at one end and discharging it at the other end.

3. In a weighing machine, the combination with balance mechanism, of a tilting scale bucket carried by said mechanism and provided with a series of pockets in echelon, and a supply hopper discharging material to be weighed into the uppermost pocket from which surplus material may overflow into one or more of the other pockets, said mechanism having a balance weight and a rack and pinion device for adjusting the same for different weights of material.

4. In a weighing machine, the combination with balance mechanism, of a tilting scale bucket carried by said mechanism and provided with a series of pockets in echelon, and a supply hopper discharging material to be weighed into the uppermost pocket from which surplus material may overflow into one or more of the other pockets, said mechanism having a toggle tripping device for releasing said bucket to discharge its contents.

5. In a weighing machine, the combination with balance mechanism, of a tilting scale bucket carried by said mechanism and provided with a series of pockets in echelon, and a supply hopper discharging material to be weighed into the uppermost pocket from which surplus material may overflow into one or more of the other pockets, said hopper having weight-actuated gates controlled by movement of said bucket.

6. A balance mechanism for weighing machines having tilting scale buckets, comprising a tripping device for releasably holding the tilting scale bucket, a toggle connected with said device and said bucket, and a stop for breaking said toggle to actuate said device to release the bucket when the weight of material in said bucket reaches a predetermined amount.

7. A tilting scale bucket for weighing machines having a series of pockets in echelon to cause material discharging into the uppermost pocket to overflow the same and fill one or more of the other pockets.

8. A tilting scale bucket for weighing machines having a series of pockets in echelon, the bottoms of said pockets being curved and arranged to receive material at one end and to discharge it at the other end.

9. A hopper for weighing machines provided with tilting scale buckets, said hopper having weight-actuated intergeared gates connected by linkage with the scale bucket of the weighing machine.

10. In a weighing machine, the combination with a pivoted balance, of primary material holding means supported on the balance a fixed distance from the pivot thereof, a supply hopper discharging material to be weighed into said primary material holding means and secondary material holding means supported on the balance at a point less distant from the pivot and arranged to receive overflow from said primary holding means.

In testimony whereof, we have signed our names to this specification.

WILLIAM E. COOPER.
FRANCISCO A. QUIROZ.